United States Patent [19]
DePaul

[11] 3,832,584
[45] Aug. 27, 1974

[54] ROTOR FOR DYNAMOELECTRIC MACHINES

[75] Inventor: Alseno S. DePaul, Pittsburgh, Pa.

[73] Assignee: Westinghouse Electric Corporation, Pittsburgh, Pa.

[22] Filed: Jan. 7, 1974

[21] Appl. No.: 431,585

[52] U.S. Cl.................. 310/211, 310/216, 310/261
[51] Int. Cl. ............................................. H02 17/16
[58] Field of Search.... 310/211, 216, 218, 261–265, 310/42

[56] References Cited
UNITED STATES PATENTS

| | | |
|---|---|---|
| 2,991,380 | 7/1961 | Pfleger............................ 310/265 X |
| 3,157,805 | 11/1964 | Hoffmeyer et al.............. 310/211 X |
| 3,194,995 | 7/1965 | McGlade .......................... 310/211 |
| 3,234,419 | 2/1966 | Picozzi.............................. 310/24 |

Primary Examiner—D. F. Duggan
Attorney, Agent, or Firm—G. H. Telfer

[57] ABSTRACT

A squirrel-cage rotor is provided having a laminated core pressed on the shaft. The shaft has an undercut recess underlying each end of the core to provide a radially yieldable section of the shaft to isolate forces tending to bend the shaft and thus reduce or substantially eliminate vibration.

4 Claims, 1 Drawing Figure

PATENTED AUG 27 1974　　　　　　　　　　　　3,832,584
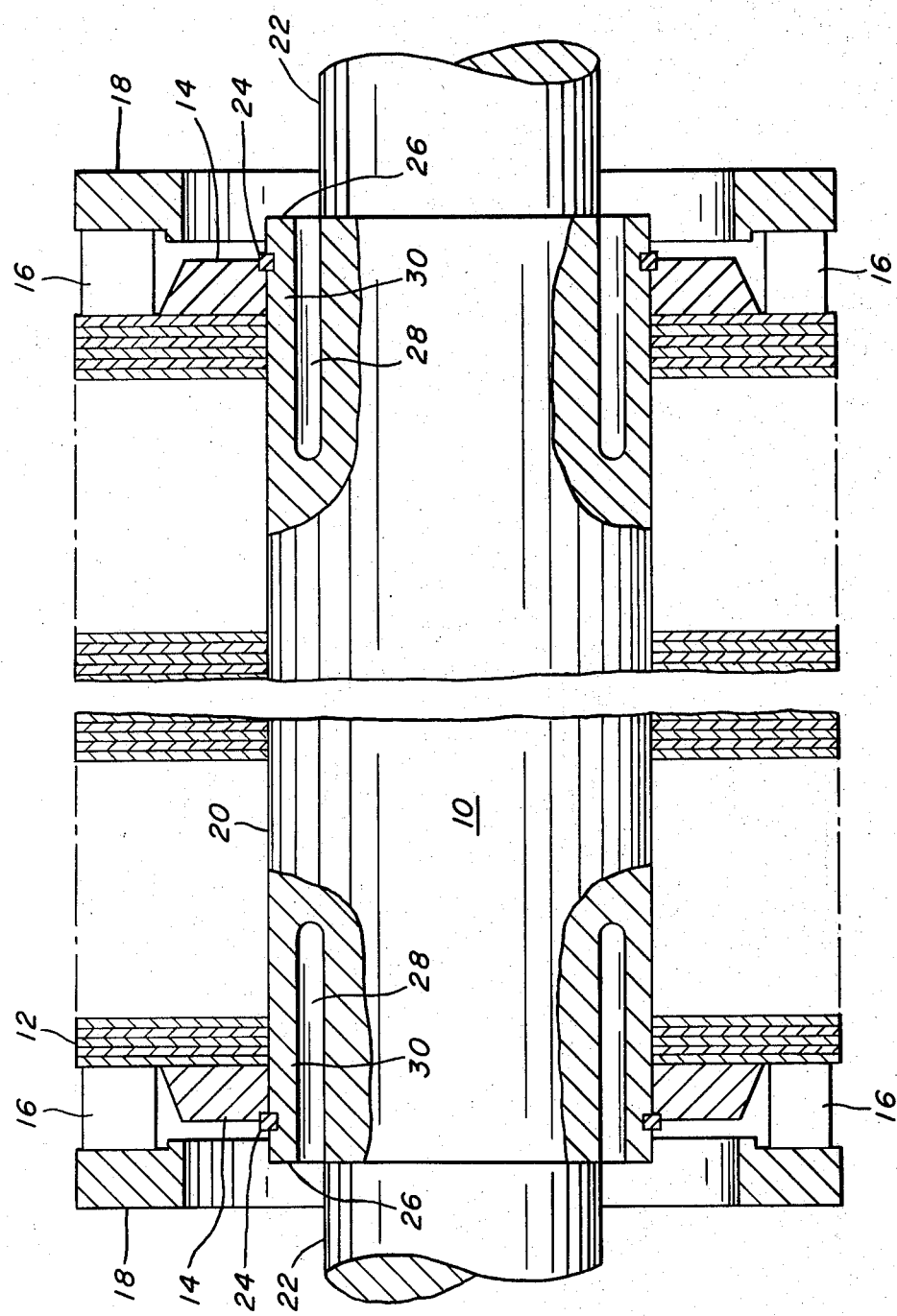

ROTOR FOR DYNAMOELECTRIC MACHINES

BACKGROUND OF THE INVENTION

The present invention relates to rotors for dynamoelectric machines, and more particularly to the reduction or substantial elimination of vibration under load in relatively large squirrel-cage rotors.

Squirrel-cage rotors of the larger sizes for induction motors often develop undesirable vibration under load, and this is a particular problem in high speed rotors such as those designed for two-pole operation which rotate at speeds approaching 3600 revolutions per minute when energized from a 60 hertz supply. It has been found that in many cases such rotors may be satisfactory at no load, when properly balanced, but that when load is applied to the motor, excessive vibration may occur.

Such rotors have a cylindrical laminated core with a squirrel-cage winding consisting of longitudinal conductor bars in peripheral slots of the core connected at the ends by short-circuiting end rings. In the manufacture of such a rotor, the laminations of the core are assembled in a stack and clamped together between end plates under very substantial clamping pressure. The core has a central bore and is pressed on the shaft with an interference fit, or it may be secured on the shaft by a shrink fit. In either case, it is possible that the clamping forces in the core or the forces between the core and shaft may not be uniform around the shaft, so that the axial forces in the core are non-uniform. It is also possible that the conductor bars may not be uniformly tight in the slots or may vary slightly in resistivity. Either of these conditions causes unequal expansion of the bars when they are heated and results in non-uniformity of axial forces in the rotor. A rotor having any of these conditions of non-uniformity, or a combination of them, may operate satisfactorily at no load, if properly balanced, but when load is applied and the winding and core become heated, the effects described above result in axial forces which are non-uniform around the shaft. Such forces tend to bend the shaft and cause undesirable and in some cases excessive vibration. It is possible to avoid this effect by building the rotor on a sleeve but this results in an extremely expensive construction. Other expedients have also been proposed, such as assembling the core on the shaft with a loose fit at both ends, as in Picozzi U.S. Pat. No. 3,234,419, but this leaves a large part of the core unsupported as well as reducing the contact area through which torque is transmitted from the core to the shaft.

SUMMARY OF THE INVENTION

In accordance with the present invention, a construction is provided for squirrel-cage rotors in which any non-uniform axial forces occurring in the rotor core which tend to apply a bending moment to the shaft are effectively isolated so that the vibration problem discussed above is substantially eliminated.

More specifically, a squirrel-cage rotor is provided having a laminated core which is secured on the shaft by an interference fit in the usual manner and which may be subject to unequal axial forces around the circumference when the winding and core become heated under load. In order to isolate these forces from the shaft, and thus prevent bending and vibration of the shaft, an undercut recess is formed in the shaft at each end of the core extending axially under the core so as to provide an overhung portion which is radially spaced from the shaft itself. Such an overhung section is radially yieldable to a sufficient extent to absorb the bending forces resulting from unequal axial forces around the shaft, and thus isolates the shaft from these forces. In this way, a relatively simple and inexpensive construction is provided which effectively avoids the problem of vibration under load discussed above.

BRIEF DESCRIPTION OF THE DRAWING

The invention will be more fully understood from the following detailed description, taken in connection with the accompanying drawing, in which the single FIGURE is a longitudinal sectional view of a squirrel-cage rotor embodying the invention.

DESCRIPTION OF THE PREFERRED EMBODIMENT

The invention is shown in the drawing embodied in a typical squirrel-cage rotor construction of relatively large size designed for relatively high speed rotation, as in a two-pole induction motor. The rotor comprises a shaft 10 which may have the usual journal portions, not shown, and may be provided with ventilation fans in the usual manner if desired. The rotor core 12 is a laminated core which may be of usual construction and comprises a stack of laminations or punchings of any suitable design assembly in a stack and clamped under substantial pressure between annular end plates 14. The core 12 is provided with peripheral slots and a plurality of longitudinal conductors 16 are disposed in the slots. The conductors may be copper or copper alloy bars and are connected at their ends by short-circuiting end rings 18 to complete the squirrel-cage winding. It will be understood, of course, that if desired a cast squirrel-cage winding could be utilized in which the conductor bars and end rings are cast in place, usually using an aluminum alloy.

The shaft 10 has a central portion 20 for engaging the core which is of relatively large diameter, and has reduced portions 22 at each side of the portion 20 which extend longitudinally and on which the journal portions of the shaft may be formed for supporting the shaft in bearings. In assembling the rotor, the laminated core 12 must be securely attached to the shaft 10 and for this purpose the core 12 is preferably pressed on the shaft with an interference fit so that the central bore of the laminated core engages the shaft throughout its length and the core is securely mounted on the shaft. If desired, other means for securing the core to the shaft might be utilized such as a shrink fit, for example. The end plates 14 between which the laminated core is clamped are secured to the shaft in a predetermined position by means of keys 24 or similar means so that the end plates and the core are securely fixed in position on the shaft.

As explained above, it may happen in the assembly of such a rotor that the clamping pressure applied to the core 12 may vary somewhat in different circumferential locations so that the axial forces are not uniform around the shaft. It is also possible that the conductor bars 16 may not all have the same tight engagement with the slots of the core, and the bars 16 even though made from the same alloy may have slightly different resistances due to small dimensional variations or non-uniformity of the alloy. When such a rotor is installed in a motor, it can be adequately balanced at no load and will rotate with such a small magnitude of vibration as to be within acceptable limits. When load is applied to the motor, however, so that substantial load currents flow in the conductors 16, the conductors become heated and the core itself becomes hot. Unequal expansion of the bars 16 will occur because of the variations between bars mentioned above, while any non-uniformity of axial forces in the core itself is increased as the core becomes heated and tends to expand. The effect of these axial non-uniformities around the shaft is to produce bending moments which are applied to the shaft primarily through the core end plates, and which cause some bending of the shaft in rotors of conventional design. This bending, even though very slight, results in a pronounced increase in vibration when load is applied to the motor, and in many cases the vibration is excessive and exceeds permissible limits.

In accordance with the present invention these bending forces which may occur in the core are isolated from the shaft itself so that excessive vibration is prevented. As mentioned above, and as shown in the drawing, the core-engaging portion 20 of the shaft is of greater diameter than the adjacent portions 22. A shoulder 26 is thus formed at each side of the core and an annular recess 28 is formed in each shoulder 26, preferably by undercutting an annular groove or recess as shown. The recess 28 is made of sufficient axial length to extend as substantial distance under the end of the core, as shown, and its radial width is such that the overhanging portion 30 of the shaft is spaced a substantial radial distance from the reduced portion 22 of the shaft which it overhangs. The overhanging section 30 is of such thickness as to be radially yieldable sufficiently to absorb the unbalanced axial forces or bending moments described above. Since the end plates 14 of the core are mounted on this overhanging portion of the shaft, and since the bending forces are transmitted primarily through the end plates, the effect is to isolate the bending forces from the main body and journal portions of the shaft.

Since the bending forces are thus effectively isolated from the shaft itself, any vibration is limited to the overhanging portions 30 and is not transmitted to the journal portions of the shaft. The excessive vibration which has heretofore often occurred when load is applied to rotors of this type is thus substantially eliminated or greatly reduced so as to be within acceptable limits. It will be noted that this result is accomplished in a relatively inexpensive manner by a simple machining operation on the shaft to cut the recesses 28 at each end of the portion 20 of the shaft. Thus, the cost of the rotor is not substantially increased over that of conventional rotors but the vibration is effectively suppressed.

The provision of the undercut recess 28 also has another significant advantage since it may be used to tune the critical speed of the rotor to correspond to any desired frequency within reasonable limits. A considerable range of dimensions is permissible for the purpose of isolating the bending forces in the manner described above, and the depth of the undercut can, therefore, be adjusted within a considerable range to change the critical speed of the rotor so that resonant frequencies can be avoided. This is a further significant advantage of the construction disclosed.

What is claimed is:

1. A rotor for a dynamoelectric machine comprising a shaft, a laminated core member, a squirrel-cage winding carried by the core member having a plurality of longitudinal conductors and short-circuiting end rings at both ends of the core member, said core member having a central bore and being mounted on the shaft with the bore engaging the shaft throughout its length, and the shaft having radially yieldable portions underlying both end portions of the core member.

2. A rotor as defined in claim 1 in which the shaft has annular recesses therein adjacent both ends of the core member, each of said recesses extending around the shaft and extending axially under the end portion of the core member.

3. A rotor as defined in claim 1 in which the core-engaging portion of the shaft is of greater diameter than the adjacent portions of the shaft, and said core-engaging portion has overhanging cylindrical portions at both ends thereof extending axially over said adjacent portions and radially spaced therefrom.

4. A rotor as defined in claim 3 in which the core member includes a stack of laminations and end plates at each end of the stack holding the laminations together under substantial clamping pressure, and said end plates are mounted on said overhanging portions.

* * * * *